United States Patent Office 3,441,362
Patented Apr. 29, 1969

3,441,362
METHOD FOR COLORING POROUS STONES
Clemens Streck, Loudonville, N.Y., assignor to GAF
Corporation, a corporation of Delaware
No Drawing. Filed Dec. 30, 1965, Ser. No. 517,817
Int. Cl. D06p 3/80, 1/02
U.S. Cl. 8—8                                          6 Claims

ABSTRACT OF THE DISCLOSURE

Naturally occurring porous stones, such as granite, marble, and limestone, and aquatic animal shells are artificially colored by applying thereto a solution of an azoic pigment, the solvent being a relatively volatile alkanolamine or lower alkyl amine. The solution may contain additional volatile solvents, dispersing agents, and other additives. An excess of caustic beyond that needed to form the alkali metal salt of the pigment gives best results.

---

There has been a great demand in the building industry for a stone which is vividly colored and at the same time, possessing sufficiently high strength so that it may be used as a building material. However, since such stone occurs naturally in only a very limited number of localities it is not readily available as a building material in most areas of the United States. Furthermore, transportation costs make the use of naturally occurring colored stones prohibitive for a great many purposes. Additionally, in view of the fact that such natural stone occurs in only a limited number of vivid colors and hues, a great restriction is placed upon its commercial employment.

Any naturally occurring porous stone can be effectively colored by the process of the present invention. The present process, however, is particularly suitable to the coloring of such materials as granite, marble, dolomitic limestone, whitestone, dolomite, calcitic limestone, or aquatic animal shells, etc. Therefore, the term "porous stone," as used hereinafter, shall represent any and all of such materials.

As a result of the disadvantages of the use of naturally occurring colored stones, there has been a great deal of experimentation to produce artificially colored stones economically having desirable properties similar to those of naturally occurring colored stones.

Until now, this experimentation has been unsuccessful in producing an artificial stone with the properties of naturally occurring materials. Such properties which have not been capable of being artificially reproduced are, for example, the vivid, intense color extending into the interior of a natural stone, high strength of naturally colored stones, good resistance to fading upon exposure to ultra-violet light, oxygen and oxidizing agents, moisture and other elements of weathering.

Prior art processes for thhe production of artificially colored stones have involved a pretreatment for the purpose of removing the moisture or water content of the stone prior to any coloring step. After the vigorous pretreatment to remove tightly held water content, the stone was colored by contacting it with a solution of a dye to produce the artificially colored product. However, in all cases, the resultant product was quite unsatisfactory due to the low level of color intensity that was capable of being produced by these processes as well as due to a weakening of its crystalline structure and lowering of mechanical properties from the vigorous water removal. In addition, the prior art processes did not result in satisfactory penetration and retention of the coloring matter throughout the stone. Furthermore, the vigorous pretreatment necessary to remove moisture or water content from the stone to be artificially colored was economically disadvantageous in that expensive special equipment and a large amount of heat was required to produce the desired result.

Therefore, in view of the great disadvantages of prior known processes for producing artificially colored stones, the art has long sought an entirely satisfactory method for the coloring of naturally occurring stones so as to resemble the less available, more expensive, natural product.

Applicant has now unexpectedly discovered, however, that suitable coloring of naturally occurring stones can be effected by the use of the process of the present invention whereby azoic pigments are employed.

It is therefore a principal object of the present invention to provide a process for artificially coloring naturally occurring stones which process is not plagued with the inherent deficiencies of the prior art processes.

It is a further object of the present invention to provide a process for artificially coloring naturally occurring stones whereby said stones have the intense coloring and mechanical strength of naturally occurring colored materials.

It is yet a further object of the present invention to provided a process for artificially coloring naturally occurring stones by the use of an amine solution of an azoic pigment.

Still further objects and advantages of the process of the present invention will become apparent from the following more detailed description of the present invention.

Applicant has unexpectedly found that a colored stone product having the intense coloring of naturally occurring colored stones and the physical characteristics thereof can be produced by the employment of amine solutions of azoic pigments as the coloring agent.

The azoic pigments which can be used in the process of the present invention are well known. These are obtained by coupling a diazotized primary amine devoid of solubilizing groups, such as carboxylic and sulfonic acid groups, with an azoic coupling component which is also devoid of solubilizing groups, such as sulfonic and carboxylic acid groups.

Such azoic pigments are well known in the art as are the diazotized aromatic primary amines and azoic components from which they are produced.

The diazotizable aromatic amines free of solubilizing sulfonic or carboxylic acid groups and the diazonium compounds derived therefrom are also well known in the art, a number of specific examples thereof being disclosed in Diserens Op. Cit., pages 242 to 261, Lubs, Op. Cit., pages 193 to 224.

The coupling components may be characterized as compounds having an active methylene group, an enolizable keto group or an aromatic hydroxy group. Such compounds are typified by the acylacetarylides, the pyrazolones and aromatic hydroxy compounds capable of coupling. Such coupling components are well known in the art, a number of specific examples thereof being disclosed for example in Diserens, "Chemical Technology of Dyeing and Printing," volume 1, pages 213 to 224 (Reinhold Publishing Corp., 1948); Lubs, "Chemistry of Synthetic Dyes and Pigments," pages 182 thru 192 (Reinhold Publishing Corp., 1955) and Adams, "Journal of the Society of Dyers and Colourists," volume 67 (1951) beginning at page 223.

In carrying out the process of this invention, the azoic pigment is dissolved in a solution of an amine. The concentration of the azoic pigment can be as high as 15% although concentrations in the range of 3 to 10% are preferred. While it is not necessary to use an alkylolamine the preferred solvent is an alkylolamine wherein the chain length may range up to about six carbon atoms, e.g. methylolamine, ethanolamine, propanolamine, butanolamine, pentanolamine, hexanolamine, diethanolamine, triethanolamine, methylethanolamine, dimethylethanolamine, diethylethanolamine, ethylethanolamine, N,N'-dihydroxyethylethylenediamine, N,N'-dihydroxyethylpropylenediamine and the like.

Instead of the alkyloamine, other relatively volatile liquid amines may be employed. These include, for example, diethylamine, triethylamine, n-propylamine, isopropylamine and n-butylamine.

In many cases, it may be desirable to employ a mixture of the solvents. Such additional solvents should have a fair degree of volatility in order that evaporation will occur reasonably quickly after the stone is treated with the pigment solution. Such additional solvents are exemplified by methanol, ethanol, propanol, butanol, pentanol, hexanol, acetone, dimethyl formamide, Cellosolve (ethyl ether of ethylene glycol), butyl Cellosolve (butyl ether of ethylene glycol), dimethyl sulfoxide, kerosene, benzene, toluene, chloroethane, and the like.

Other additives, such as dispersing agents, penetrants, and the like may also be present in the dyeing solution of the present invention. In order to obtain optimum color, it is also necessary that the solution be alkaline in nature. For best results the minimum of caustic is that amount which will form the alkali metal salt of the pigments. Preferably, there should be an excess of caustic up to about 1% to 500 % excess of the minimum amount depending on the type of pigment ued. The alkali metal, which is sodium or potassium, is preferably added in solution form, as sodium or potassium hydroxide.

To reduce the pigment solution, the pigment, solvents and alkali are combined to produce a solution of desired strength, i.e., about 0.1–15%. The solution is then wiped onto the stone or the stone is dipped into the solution or the stone is sprayed by the solution. After about 10 minutes to 1 hour, the stone may be wiped with a damp cloth and/or washed with water. The stones that are produced by such process are beatifully colored, and in most cases have good light fastness, and are extremely insensitive to solvents and acids, etc.

It is important to note that the dyeing process of the present invention does not necessitate a pretreatment step for the removal of water. This, therefore, is a great advantage over previously employed dyeing methods. Moreover, by the process of the present invention, dyeing of exceptional light fastness is produced along with an unusual insensitivity to solvents and acids, etc. Therefore, in addition to the use of these materials as building stones, etc., the products produced by the process of the present invention have found outstanding utility as plates for mounting certain types of machinery found in commercial installations because of their unusual insensitivity to solvents, acids, etc. Of course, the product of the present invention can be used for building, gravestones, etc., or any other special use where strength and coloring are desired.

The following specific examples illustrate various embodiments of the present invention. Such examples are illustrative only and are not to be deemed as limiting the invention set forth in the foregoing specification and appended claims:

Example 1

A solution was prepared which consisted of:

| | |
|---|---|
| 3,3'-dichlorobenzidine acetoacet-o-toluidide ____g__ | 10 |
| Cellosolve _____cc__ | 50 |
| Diethylaminoethanol _____cc__ | 100 |
| Sodium hydroxide 40° Bé _____cc__ | 20 |
| Cellosolve _____cc__ | 50 |

The solution was wiped onto a piece of granite stone plate. After some 30 minutes the stone plate was washed with water. The treatment removed some of the surface color and brightened the shade. A very beautiful yellow coloration was obtained.

Example 2

Example 1 was repeated with the exception that the pigment of Example 1 was replaced by 10 g. of the pigment dianisidine ⇉ 3-hydroxy-2-naphthanilide. In this instance a blue dyeing was obtained on the granite.

Example 3

Example 1 was repeated with the exception that the pigment of Example 1 was replaced by 10 g. of the pigment dianisidine ⇉ phenylmethylpyrazolone. In this instance a pleasing red dyeing was obtained on the granite.

Example 4

Example 1 was repeaated with the exception that the pigment of Example 1 was replaced by 5 g. of the pigment of Example 1 and 5 g. of the pigment of Example 2. In this case a pleasing green dyeing was obtained.

Examples 5–14

Example 1 was repeated with the exception that the pigment of Example 1 was replaced by the following pigments:

| Ex. | Pigment | Color |
|---|---|---|
| | Dianisidine⇉(8-amino-2-napthol)→o-nitroaniline). | Black. |
| 6 | 4-benzoylamino-2,5-diethoxyaniline→Naphthol AS. | Blue. |
| 7 | 5-methyl-o-anisidine→3-hydroxy-2-naphthnitroanilide. | Bordeaux. |
| 8 | 5-chloro-o-anisidine→2-hydroxy-3-carbazolecarboxy 4'-chloroanilide. | Brown. |
| 9 | 5-chloro-o-anisidine→8-amino-2-naphthol | Do. |
| 10 | 4'-amino-5'-chloro-o-benzanisidide→3-hydroxy 2-naphth(2-methyl-p-anisidide). | Corinth. |
| 11 | 5-chloro-o-anisidine→4'-benzoylamido-2',5'-dimethoxybenzoylacetanilide. | Yellow. |
| 12 | m-Chloroaniline→3-hydroxy-2-naphth-o-phenetidide. | Orange. |
| 13 | 4-benzoylamido-5-methyl-o-anisidine→Naphthol AS. | Violet. |
| 14 | 2,5-dichloroaniline→3-hydroxy-2-naphth-o-anisidide. | Scarlet. |

What is desired to be protected by Letters Patent is:

1. A process for artificially coloring naturally occurring porous stone comprising applying to said stone a solution of an azoic pigment in an organic amine selected from the group consisting of alkanolamines and lower alkyl amines.

2. The process of claim 1 wherein said amine comprises an alkanolamine having up to six carbon atoms.

3. The process of claim 2 wherein said alkylolamine solution of azoic pigment additionally contains sufficient alkali metal hydroxide to form the alkali metal salt of the pigment.

4. The process of claim 3 wherein said alkali metal hydroxide is present in an excess of from 1% to 500% of the minimum amount necessary for the preparation of an alkali metal salt of the pigment.

5. The proecss of claim 3 wherein the azoic pigment is present in a concentration of from 0.1 to 15% by weight.

6. The process of claim 5 wherein the azoic pigment solution contains an additional solvent selected from the group consisting of lower alkyl alcohols, acetone, dimethyl formamide, lower alkyl ethers of ethylene glycol, dimethyl sulfioxide, kerosene, benzene, toluene and chloroethane.

References Cited

UNITED STATES PATENTS

| 113,127 | 3/1871 | Zengeler. | |
|---|---|---|---|
| 770,643 | 9/1904 | Klie. | |
| 3,079,209 | 2/1963 | Boggus | 8—8 |

DAVID KLEIN, Primary Examiner.

U.S. Cl. X.R.

117—123